UNITED STATES PATENT OFFICE.

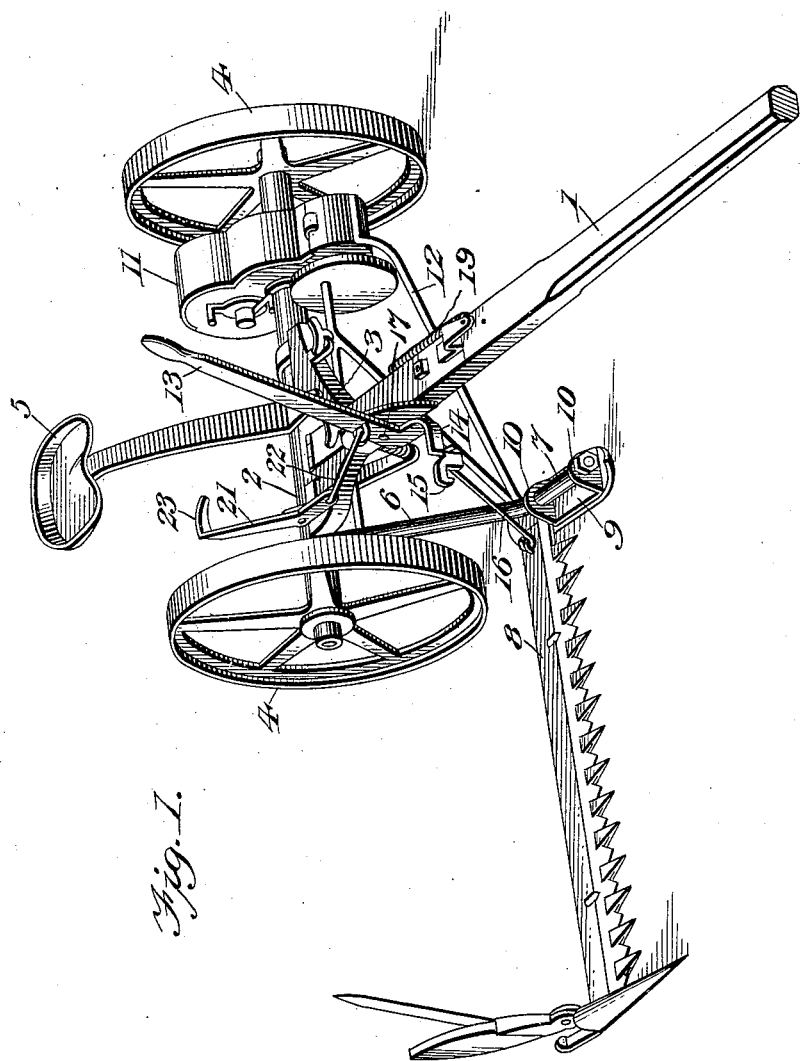

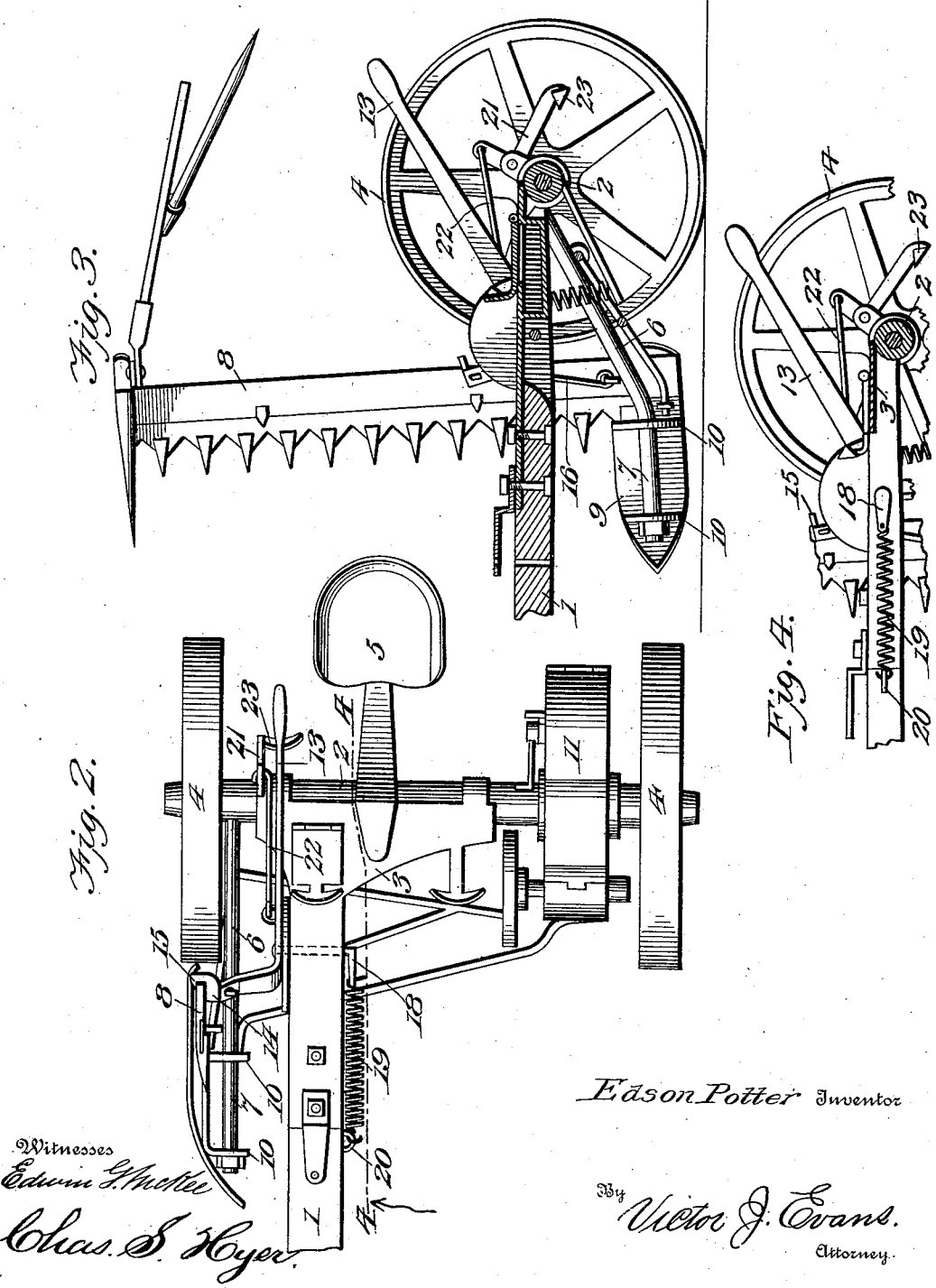

EDSON POTTER, OF GREENSBURG, INDIANA.

MOWING-MACHINE.

SPECIFICATION forming part of Letters Patent No. 712,960, dated November 4, 1902.

Application filed November 20, 1901. Serial No. 83,052. (No model.)

*To all whom it may concern:*

Be it known that I, EDSON POTTER, a citizen of the United States, residing at Greensburg, in the county of Decatur and State of Indiana, have invented certain new and useful Improvements in Mowing-Machines; and I do hereby declare the following to be a full, clear, and exact description of the invention, such as will enable others skilled in the art to which it appertains to make and use the same.

My invention relates to mowing-machines, and has for its object the production of a device to be attached thereto, by means of which the cutter-bar thereof may be raised or lowered and which will be cheap, durable, and efficient.

The invention consists in the construction, combination, and arrangement of parts hereinafter fully described and claimed.

In the drawings, Figure 1 is a view in perspective of a mower embodying the invention. Fig. 2 is a top plan view of the same with the cutter-bar raised. Fig. 3 is a longitudinal section through the tongue of the machine, and Fig. 4 is a sectional view upon the line 4 4 of Fig. 2.

The reference-numeral 1 designates the tongue of the machine, and 2 the axle thereof, connected with the tongue by a platform 3. The carrying-wheels 4 are mounted upon the axle, and the driver's seat 5 is supported from the platform.

6 designates an inclined arm secured to the axle near one end thereof, and to the forwardly-extending end 7 of said arm is pivotally secured the inner end of the cutter-bar 8 by means of a bracket-plate 9, having parallel perforated ears 10, through which the end 7 extends. The arm 6 is braced to the casing 11 by a brace-rod 12, said casing containing the gearing for reciprocating the knives of the cutter-bar.

13 designates a lever fulcrumed at one side of the tongue and provided at its lower end with an extension 14, formed with a hook 15, adapted to engage the cutter-bar when the latter is in its raised position.

The extension 14 of the lever is connected to the inner end of the cutter-bar by a link 16.

17 designates a shaft journaled upon the tongue 1, and rigidly secured to one end thereof is the lever 13, thereby fulcruming the same upon the tongue 1. The inner end of the shaft is formed with an arm 18, providing an L-shaped shaft and to which is attached one end of a coil-spring 19, the opposite end of which is secured to a staple 20, projecting from the side of the tongue. The function of this spring 19 is to force the hooked extension forward and hold its hook in engagement with the rear edge of the cutter-bar, as shown in Figs. 2 and 3. When the lever 13 is drawn back, the spring 19 is permitted to contract, thereby exerting a forward pull upon the arm 18, thus keeping the hook 15 in engagement with the cutter-bar, whereby all liability of the casual disengagement of the hook 15 from the cutter-bar is obviated.

21 designates a foot-lever of bell-crank form fulcrumed on a bracket projecting from the axle and connected by a link 22 with the lever 13. The upper end of the bell-crank lever 21 is formed with a pedal or foot-rest 23, by means of which the lever is depressed to partially raise the cutter-bar and draw the lever 13 rearward within easy reach of the driver. A rearward pull upon the lever 13 completes the lifting of the cutter-bar, so that the hook 15 will engage said bar and hold it in elevated position against the tension of the spring 19.

The devices thus described afford effective means for raising the cutter-bar and supporting it in raised position and provide a convenient and easily-operated attachment for mowers.

I claim—

1. The combination with a mowing-machine and its cutter-bar; of a lever fulcrumed on the machine-tongue for raising the cutter-bar, and having a hooked extension to engage the cutter-bar, and a spring for maintaining the engagement of the lever and bar.

2. The combination with a mowing-machine and its cutter-bar; of a hand-lever fulcrumed on the machine-tongue to raise the cutter-bar, and having a hooked extension to engage the cutter-bar and support it in elevated position, a spring for forcing the lever forward, and a foot-lever having a link connection with the hand-lever.

3. The combination with a mowing-machine and its cutter-bar, of an L-shaped shaft journaled upon the machine-tongue, a lever secured upon the shaft for raising the cutter-bar, and having a hooked extension to engage the cutter-bar, and a spring having one end secured to the tongue and the other end secured to the arm of said shaft.

In testimony whereof I affix my signature in presence of two witnesses.

EDSON POTTER.

Witnesses:
  RUFUS P. HAMILTON,
  GEORGE M. THOMPSON.